United States Patent [19]

Stuker et al.

[11] Patent Number: 5,707,073
[45] Date of Patent: Jan. 13, 1998

[54] STABILIZER LINK

[75] Inventors: Robert W. Stuker, Bolingbrook; Frederick Winkler, Morton Grove, both of Ill.

[73] Assignee: Mohawk Manufacturing & Supply, Inc., Niles, Ill.

[21] Appl. No.: 503,427

[22] Filed: Jul. 17, 1995

Related U.S. Application Data

[60] Provisional application No. 60/000,477, Jun. 23, 1995.
[51] Int. Cl.[6] ................................. B60G 11/20
[52] U.S. Cl. ................. 280/665; 280/689; 280/717
[58] Field of Search ...................... 280/665, 689, 280/717, 664, 725, 679, 695, 700, 721, 726

[56] References Cited

U.S. PATENT DOCUMENTS

| 4,690,234 | 9/1987 | Takada | 280/665 X |
|---|---|---|---|
| 4,875,703 | 10/1989 | Murakami | 280/665 |
| 4,944,523 | 7/1990 | Hardy, Jr. | 280/689 |
| 5,062,656 | 11/1991 | Hyads et al. | 280/689 |
| 5,064,216 | 11/1991 | Hyads | 280/689 |
| 5,076,605 | 12/1991 | Umeda | 280/689 |
| 5,368,326 | 11/1994 | Turck et al. | 280/689 |
| 5,380,036 | 1/1995 | Perkins et al. | 280/716 |
| 5,551,722 | 9/1996 | Schwartz et al. | 280/689 |

FOREIGN PATENT DOCUMENTS

| 3028014 | 2/1991 | Japan | 280/689 |
|---|---|---|---|

Primary Examiner—Christopher P. Ellis
Attorney, Agent, or Firm—Olson & Hierl, Ltd.

[57] ABSTRACT

A stabilizer link for a steering and suspension assembly for a bus or other vehicle comprising a pair of shafts and a housing that is defined by a pair of cylinders that are joined together by a rod or stem. Each cylinder defines a pair of contiguous tapered bores opening in opposite directions for receiving one of the shafts. Each shaft secured to the housing by replaceable components, namely, a pair of washers, a pair of bushings, and a nut secured to the other threaded end of the shaft. Each pair of bushings is matingly received within bores.

40 Claims, 4 Drawing Sheets

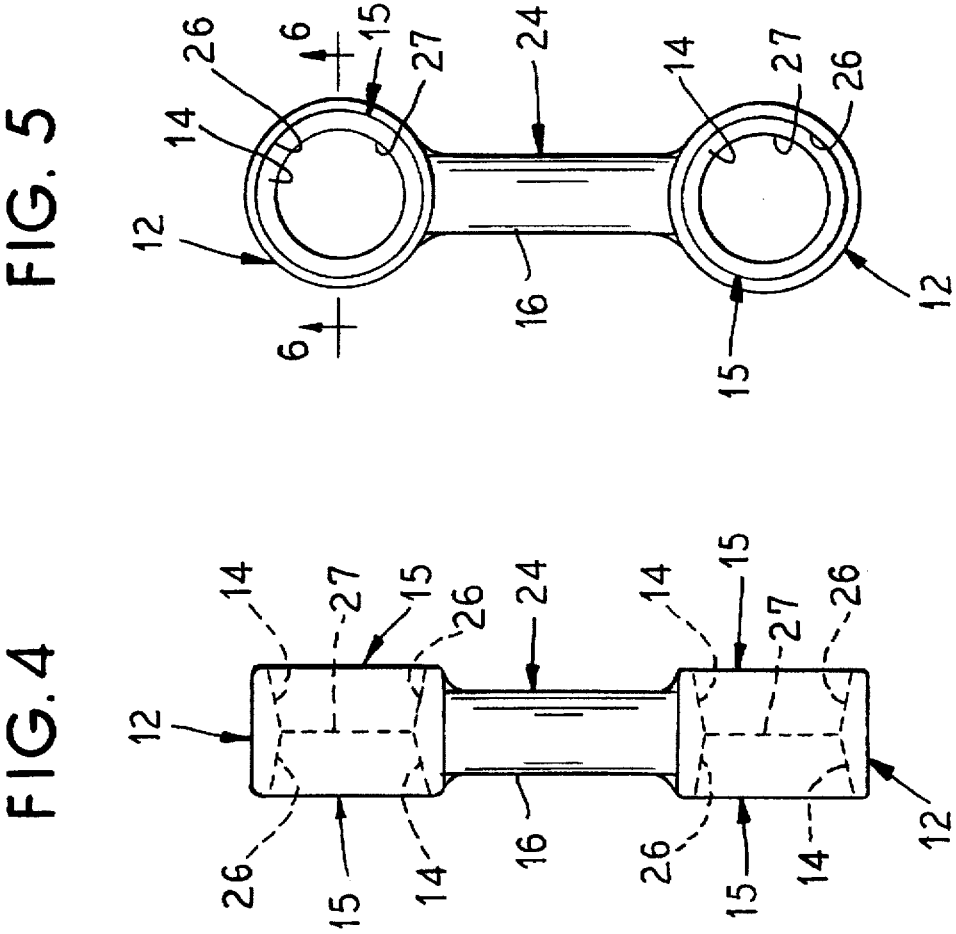

STABILIZER LINK

CLAIM OF PRIORITY

This application claims the priority of provisional U.S. patent application Ser. No. 60/000,477 entitled "Stabilizer Link", filed on Jun. 23, 1995 naming Robert W. Stuker and Frederick Winkler as inventors.

1. Technical Field of the Invention

The present invention relates to a stabilizer or torsion bar link that can be used to stabilize the suspension for a vehicle, such as, for example, a bus or a car.

2. Background of the Invention

A suspension assembly for a bus or other vehicle usually includes, among other components, a torsion bar and a connecting or stabilizer link. The torsion bar (which also may be called a stabilizer or sway bar) is generally affixed to the vehicle frame with the stabilizer link functioning as the connecting member to the axle. The torsion bar absorbs torsional loading while the stabilizer link additionally must act as a shock absorber.

The stabilizer link can have a generally U-shaped construction that includes a metal housing and a pair of metal shafts permanently secured to the housing. The shafts are also connected to other components of the assembly, such as the axle plate (or associated part) and the torsion bar.

It is known to use rubber as an intermediary to permanently secure the shafts to the housing to add flexibility to the link so that the stabilizer link is better able to absorb road shocks. To construct such a link, rubber is molded to one end of each shaft. The ends of the shaft are then inserted into the bores defined in the housing. The housing is crimped radially around each bore to permanently secure the shafts to the housing.

A disadvantage of this known stabilizer link, however, is that it has a relatively short life expectancy because the rubber tends to shear or become worn relatively quickly and much sooner than the rest of the components. Thus, once the rubber shears or becomes worn, the entire stabilizer link is no longer useful and must be replaced.

In an attempt to provide a stabilizer link with a longer life expectancy, an all metal stabilizer link that uses all metal ball studs has been developed. Although this stabilizer link indeed has a longer life expectancy than the link discussed above, it is undesirable because it lacks flexibility and does not absorb road shocks as well as the other link. As a result, the all metal link tends to transfer stress to the suspension which, over time, will shorten the life of various parts in the suspension.

What is needed is a stabilizer link that is capable of effectively absorbing road shocks better than the prior art stabilizer links, and that is more economical than the prior art stabilizer links. Such a link should include a flexible element to absorb the shocks, but should also address the problem of short life expectancy associated with the known link having a flexible element. The present invention meets these desires.

SUMMARY OF THE INVENTION

The present invention provides a stabilizer link for a steering and suspension assembly for a bus or other vehicle. In its preferred embodiment, it includes a pair of shafts or studs, and a housing that is defined by a pair of eyes or cylinders that are joined together by a rod or stem. Each cylinder defines a pair of adjoining or contiguous, tapered bores opening in opposite directions for receiving a pair of bushings.

Preferably, both ends of each shaft are threaded, with a distal threaded end of each shaft being secured to another component of the assembly such as the axle plate (or associated part) or torsion bar. Each shaft may be secured to the housing by replaceable components, such as, a pair of proximal and distal retaining washers, a pair of bushings, and a fastener such as a nut secured to a proximal threaded end of the shaft.

The bushings preferably are constructed of polyurethane, which has a longer life expectancy than rubber or synthetic rubber and has better shock absorbing dynamics. Polyurethane also has a relatively high degree of elasticity. Preferably, the polyurethane has a hardness of about 85 to about 95 durometers on the Shore A scale, and optimally about 90 durometers. Alternatively, the bushings may be constructed of rubber or synthetic rubber that preferably has a hardness of about 70 durometers.

Each pair of bushings is received within one of the respective pairs of bores defined by the cylinders. Desirably, each bushing has a first frustoconical wall with a taper that narrows toward the end of the bushing. The first frustoconical outer walls preferably complement the tapered bores. This construction eliminates or reduces lateral displacement of the housing relative to the bushings and shaft. The tapers also eliminate or reduce longitudinal displacement of each bushing in the direction of its adjacent bushing.

Each bushing may also have a second frustoconical outer wall with a taper that narrows toward the other end of the bushing, which extends outside the bore. This construction tends to relieve pressure and avoid pinching of the bushing between the washers and the cylinders when the bushing is under compression during service.

Preferably, the retaining washers are disposed about the shafts, and abut the ends of the bushings that extend outside the bores. The holes defined by the proximal and distal washers are different sizes. Each retaining washer may have a circumferential flange angled with respect to a flat portion to form a dish shape configuration. The flanges of each pair of proximal and distal washers face away from the bushings, which also helps to relieve pressure when the bushing is under compression yet still contain the bushings in the housings. With this construction, when the shaft is deflected from center, it causes further compression of the bushings. The orientation of the dish-shaped washers allows relief from this compression. The dish shape also provides a surface for the bushing to "roll" against.

Alternatively, however, the dish shaped retaining washers can face each other, or the washers instead can be flat washers.

In the preferred embodiment, the nuts are conventional castle nuts adapted to engage a cotter pin for securing the nuts. With this embodiment, one of the threaded ends of the shaft also defines a cotter pin hole for receiving the cotter pin. This construction tends to be more reliable against shock and vibration than other alternatives, and also avoids causing damage to the threads of the shafts. Alternatively, however, a nylon insert nut or an all metal lock nut can be used.

The preferred embodiment of the present invention provides a stabilizer link that is more economical than the prior art links because its components can be easily and quickly replaced when they fail or become worn. As a result, the link can be reused and does not have to be discarded when one of its components fails or becomes worn.

In this regard, cost savings likely will be appreciated most in connection with the replacement of bushings since they tend to have substantially shorter lives than the rest of the components of the stabilizer link and also tend to be significantly less expensive than the housing and shafts. Thus, with the present invention, the bushings can be continuously replaced as they become worn, thereby substantially extending the life of the stabilizer link.

If desired, the stabilizer link may be sold together as a fully-assembled link. Alternatively, all of the components may be sold together (e.g. the housing, retaining washers, bushings, nuts and pins) in a container such as a box or bag as a kit, if desired. The components can then be assembled and installed on a vehicle. Thereafter, when the bushings (or other components) become worn, new bushings (or other components) can be obtained separately from the kit, and then can be replaced.

Similarly, the components that tend to be replaced more frequently can also be sold together as a kit. For example, two pairs of bushings, two pairs of retaining washers, a pair of castle nuts and a pair of cotter pins may be sold together in a package to be used when any or all of these original (or previously replaced) components become worn. Such a kit enables quick and easy replacement of the corresponding components.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 4 is a plan view of the side of the housing of the stabilizer link of FIGS. 2, illustrating with dotted lines the inner walls of the cylinders;

FIG. 5 is a plan view of the top of the housing of FIG. 4; and

FIG. 6 and is a cross section view taken along the lines 6—6 of FIG. 5.

DDETAILED OF THE INVENTION

Figure 1:
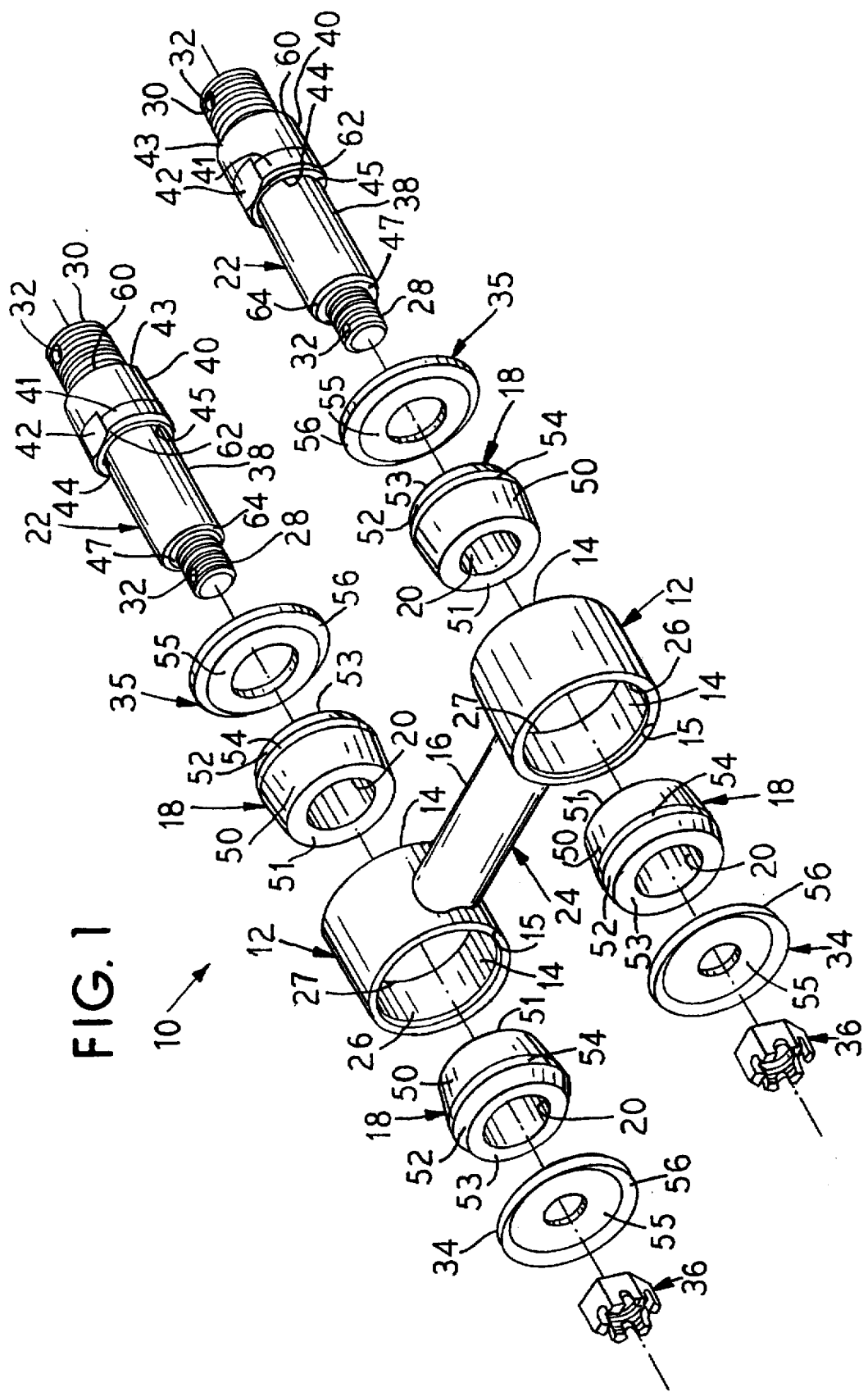
FIG. 1 is an exploded perspective view of a stabilizer link in accordance with one embodiment of the invention.

As illustrated in FIGS. 1–6, the stabilizer link 10 in accordance with the preferred embodiments of the invention includes a pair of cylinders or eyes 12. Each cylinder 12 defines a pair of connected or contiguous, tapered bores 14 opening in opposite directions along a common axis to define respective open ends 15. The cylinders 12 are joined by a stem or a rod 16 so that the axes of the pairs of bores 14 are substantially parallel. Two pairs of bushings 18 are also included, and each pair is matingly received into a respective pair of bores 14. Each bushing 18 defines a cylindrical aperture or channel 20 along its axis.

The stabilizer link 10 also includes two shafts 22, each of which is received into the respective pair of bores 14 defined by the cylinder 12 and the channels 20 defined by the respective pair of bushings 18. Means for retaining the shafts 22 within the bores 14 and channels 20 are also included.

The cylinders 12 and stem 16 together define a housing 24 that may be a one-piece housing made from a molded polymer or metal (see, e.g., FIG. 1). Alternatively, the housing 24 may be a three-piece steel weldment wherein the cylinders 12 are welded to the stem 16 (see, e.g., FIGS. 2–5). In this alternative construction, the cylinders 12 may, for example, be a Monroe Shock Stock No. 11963. The stem 16 preferably has a circular cross section substantially along its length.

Each cylinder includes an inner wall 26 that defines one of the pairs of bores 14 and a central ridge 27 that divides the bores 14. The ridge 27 may define a flat face that extends parallel to the axis of the bores, or may have a rounded face. The inner walls 26 of each cylinder 12 adjacent each end 29 of the cylinder may be rounded (FIG. 6).

Preferably, each shaft 22 defines a proximal end 28 and a distal end 30, both of which are threaded and include cotter pin holes 32. The distal ends 30 of shafts 22 are secured to another component of the steering and suspension assembly. For example, the distal end 30 of one shaft 22 may be secured to the axle plate (or associated part) and the distal end of the other shaft may be secured to the stabilizer bar. The cotter pin hole 32 on the distal end 30 of the threaded shaft 22 may be used to secure a fastening nut that is used to attach the shaft to the assembly component. The diameter of the distal end 30 may be greater than the diameter of the proximal end 28.

The means for retaining each shaft 22 within the bores 14 includes one of the pairs of bushings 18, a pair of retaining washers, namely a proximal washer 34 and a distal washer 35, and a fastener such as nut 36 secured to the threaded proximal end of the shaft.

Each shaft 22 includes a bushing portion 38 adjacent the proximal end 28, a tapered portion 40 adjacent the distal end 30, and a central portion 41 joining the bushing portion and the tapered portion. One of the pairs of bushings 18 and one of the distal washers 35 is disposed about the bushing portion 38 of each shaft. The diameter of the bushing portion corresponds to the diameters of the channels 20 of the bushings 18 and the distal washer 35, and is less than the diameters of the tapered and central portions 40, 41.

The tapered portion 40 of the shaft 22 defines a gradual inward tapering in the direction of the distal end 30 of the shaft 22 for engaging mating surfaces on the components of the steering and suspension assembly. The central portion 41 defines a first lateral face 43 adjacent the distal end 30 and a second lateral face 45 adjacent the bushing portion 38. The bushing portion defines a third lateral face 47 adjacent the proximal end 28. The shaft 22 may be constructed of any suitable metal such as a steel with an elevated hardness commonly known as "Stressproof", or of any other suitable material.

Each shaft 22 may also include a pair of diametrically-opposed wrench flats 42 to be used to tighten the nuts 36. In the illustrated embodiments, the wrench flats are formed on the central portion 41, extending onto the tapered portion 40. Alternatively, alternate "drive" methods could also be used such as, for example, a hex socket broached or forged into the end of the stud. In addition, a radius corner portion 44 may be formed at the distal end of the bushing portion 41 adjacent the lateral face 45 for reducing the stress that tends to cause the formation of fractures. Tapered or broken corner portions 60, 62 and 64 may be defined on the periphery of respective lateral faces 43, 45 and 47 to eliminate sharp edges.

The bushings 18 desirably are substantially the same in configuration and material. In the preferred embodiment, the bushings 18 are constructed of polyurethane, which has a longer life expectancy than rubber or synthetic rubber and has better shock absorbing dynamics. Polyurethane also has a relatively high degree of elasticity. Preferably, the polyurethane has a hardness of about 85 about 95, and optimally about 90 durometers on the Shore A scale. The bushings 18 may, for example, be polyurethane bushings that are available from Gabriel as part No. #415025, or a standard polyurethane bushings that can be obtained from Euclid.

Each bushing 18 includes a pair of flat ends 51, 53 that extend substantially perpendicular to the axes of the bores, and first and second frustoconical outer bushing walls 50, 52 that are joined together by a neck 54. The flat ends 53 of each pair of bushings 18 are in abutting engagement within a respective cylinder 12. The outer diameters of the flat ends 51, 53 are substantially the same.

The first outer bushing wall 50 is received substantially within its respective bore 14, and the second outer bushing wall 52 extends at least partially beyond its respective bore 14. Desirably, the first outer bushing wall 50 extends most of the length of the bushing 18, is tapered inwardly towards the proximal end of the bushing, and has a more gradual taper than the second outer bushing wall 52. The neck 54 may be inwardly tapered toward the first outer bushing wall, and its length is substantially less than the second outer bushing wall 52. The first outer bushing walls 50 complement the tapered bores 14. This construction eliminates or reduces lateral displacement of the housing 24 relative to the bushings 18. It also eliminates or reduces the longitudinal movement of each bushing 18 in the proximal direction.

Despite the advantages of the polyurethane bushing, it is appreciated that the bushings 18 can instead be constructed of any other suitable material, such as rubber or synthetic rubber. Preferably, the material chosen has a relatively long life expectancy. In this regard, some important characteristics to consider in choosing a suitable material are its ability to withstand adverse weather condition and its ability to resist water, oil and ozone.

It is noted that natural and most synthetic rubbers have their best mechanical characteristics (tensile strength, elongation, compression set, etc.) when produced at a 70 durometer. Typically, the rubber is then compressed to get the hardness needed to withstand the shock loads. Polyurethane bushings, on the other hand, generally do not need the same degree of compression because of the increased hardness of polyurethane.

Each pair of proximal and distal retaining washers 34, 35 is disposed about one of the shafts 22. Each washer 34, 35 has an outer diameter substantially the same as or slightly less than the outer diameter of the cylinders 12. Each distal washer 35 is disposed about one of the respective bushing portions 38, and is disposed between and in abutting engagement with the flat end 53 of one of the bushings 18 and the lateral face 45 of one of the shafts 22. The inner diameter of the distal washers 35 complements the diameter of the bushing portion 38 and radius corner portion 44.

The proximal washer 34 is disposed about the proximal end 28 of one of the respective shafts 22, and is disposed between and in abutting engagement with another bushing 18 and one of the nuts 36. The inner diameter of the proximal washer 34 complements the diameter of the radius corner portion 44 of the shaft 22. The inner diameter of the proximal washer 34 is less than the inner diameter of the distal washer 34.

Desirably, each washer 34, 35 includes a flat portion 55 and a circumferential flange 56 angled with respect to the flat portion to form a dish shape, and the flanges extend in opposite directions away from the respective pair of bushings 18. The flanges preferably extend at an angle of about 15 degrees to about 45 degrees and optimally at about 30 degrees. The outer diameter of the flat portion 55 is about the same as the outer diameters of the flat ends 51, 53 of the bushings 18. The thicknesses of the proximal and distal washers 34, 35 may be substantially the same.

Preferably, prior to assembly, the length of the bushing portion 38 of the shaft 22 is less than the dimension defined by the length of one of the pairs of bushings 18 plus the thickness of the flat portion 55 of the distal washer 35. During assembly, however, the bushings are compressed so that, in the assembled link, the length of the bushing portion 38 of the shaft 22 is about the same as the dimension defined by the length of one of the pairs of bushings 18 plus the thickness of the flat portion 55 of the distal washers 35.

The flanges 56, the inward tapering of the second outer bushing walls 52 of the bushings 18, and the rounded off inner walls 26 of the cylinders 12 tend to relieve pressure on the bushings when they are under compression, which can occur when the shaft 22 is deflected off center from absorbing road shocks. This construction provides an area in which the bushing can expand while under pressure. It also reduces the likelihood of any "pinching" of the bushings 18 between the washers and cylinders 12. The dish-shaped retaining washers 34, 35 also provides a surface for the bushing to "roll" against.

If desired, however, the flanges 56 can face the same direction (see FIG. 3), or, instead, flat retaining washers can be used.

Figure 2:
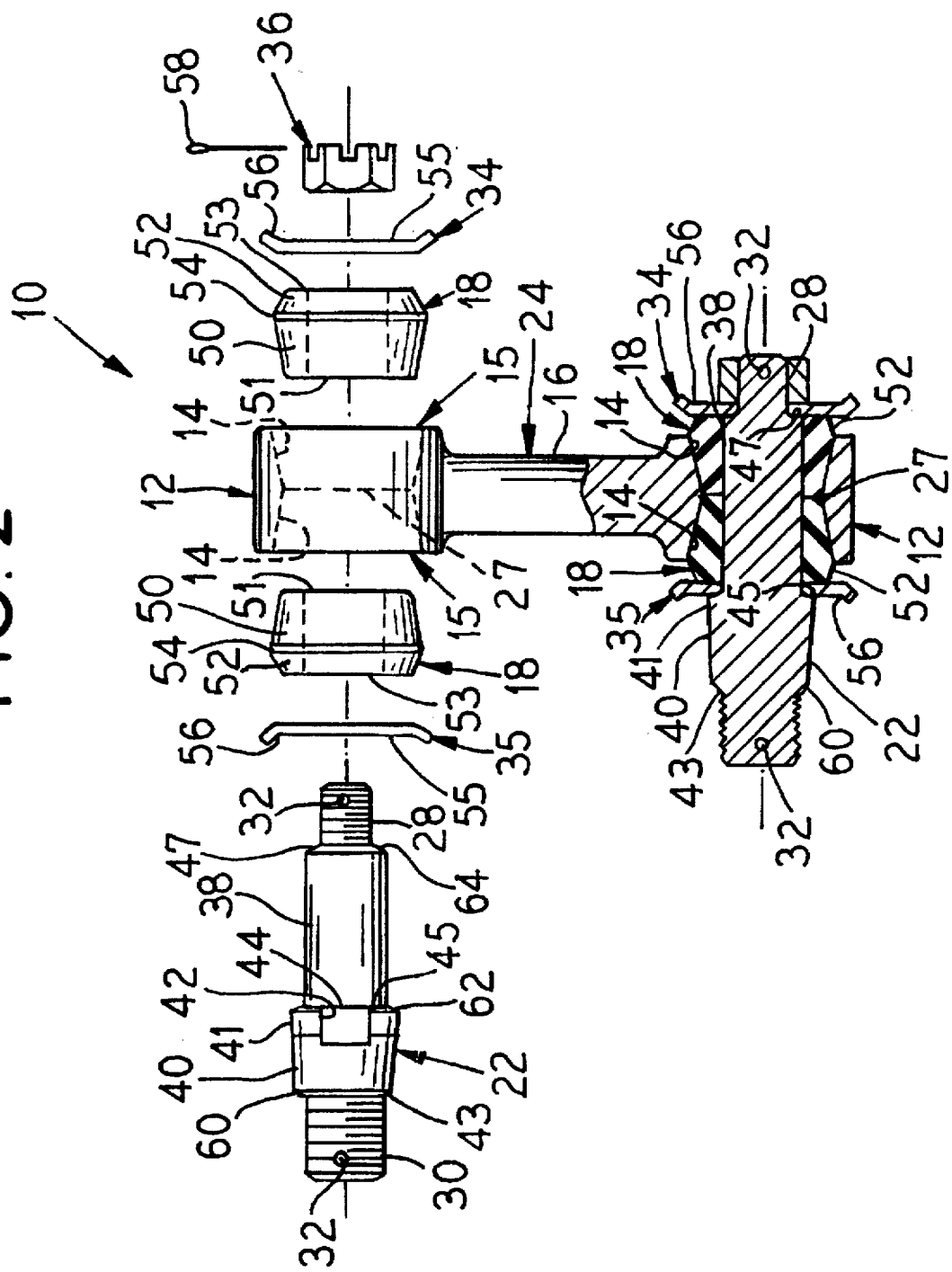
FIG. 2 is a partial exploded and partial cross section view of a stabilizer link similar to the link of FIG. 1.
Figure 3:
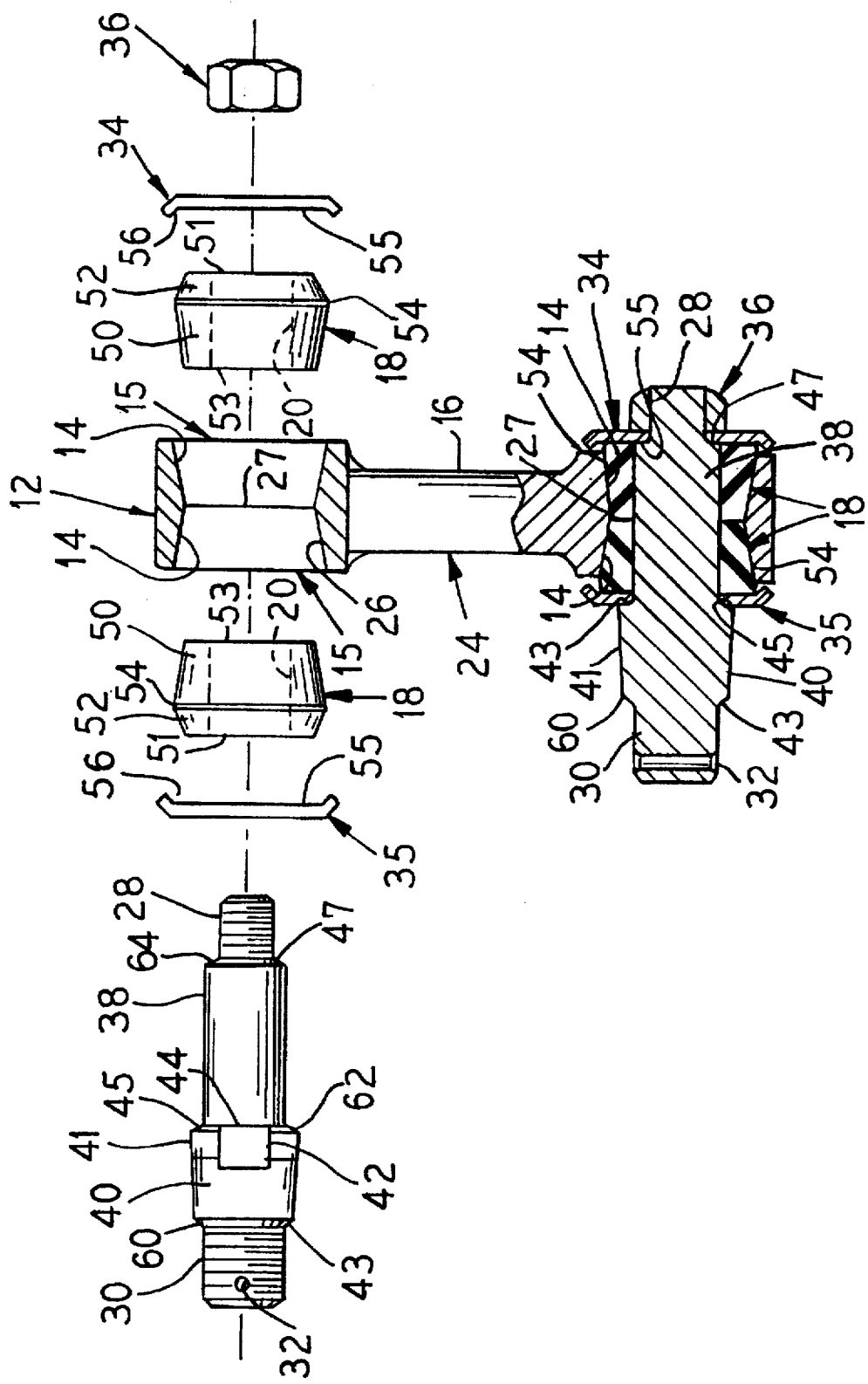
FIG. 3 is a partial exploded and partial cross section view of a stabilizer link in accordance with an alternative embodiment of the invention, illustrating the dish-shaped retaining washers facing each other and conventional nuts secured to the shafts.

The nuts 36 may be conventional nuts (see FIG. 3) but, preferably are conventional castle nuts adapted to receive a cotter pin 58 used to secure the nuts (see FIG. 2). The cotter pin 58 also extends through one of the cotter pin holes 32 formed on the shafts 22. Generally, application of about 70 foot-pounds of torque will sufficiently secure the nuts to the assembly. An advantage of this construction is that it is more reliable against shock and vibration than other alternate means of securing the nut 36 to the shaft 22. Also, this construction avoids damaging the threads of the shafts 22. Alternatively, however, a nylon insert or an all metal lock nut can be used.

Examples of dimensions and materials useful for making the present invention are disclosed in detail in provisional U.S. patent application Ser. No. 60/000,477 filed Jun. 23, 1995 for which priority is claimed. That entire disclosure is incorporated by reference. Those of ordinary skill in the art will recognize that various dimensions and materials can be used depending on the exact use of the present invention.

One of the advantages of the stabilizer link 10 in accordance with the present invention relates to the replaceability of the individual components, such as the bushings 18 which tend to have shorter life than the remaining components of the stabilizer bar. When the bushings 18 are no longer useful due to wear and tear (or any other reason), they can be replaced quickly and easily. Because the rest of the components can still be used, this results in cost savings each time the bushings are replaced.

If desired, all the components may be sold together (e.g., the housing 24, shafts 22, bushings 18, retaining washers 34, 35, nuts 36 and pins 58) in a container such as a box or bag as a kit, if desired. The components can then be assembled and installed on a vehicle. Thereafter, when the bushings 18 become worn, new bushings can be obtained separately from the kit, and then can be replaced in accordance with the above. It is appreciated that other components may be individually replaced.

Additionally, some of the components which may need to be replaced on a more frequent basis may be sold together in a container such as a box or bag as a kit, if desired. When the corresponding components on the link 10 become worn, the kit can be used to replace the worn components.

For example, two pairs of bushings 18 and two pairs of proximal and distal retaining washers 34, 35 may be sold together as a kit for replacement of the corresponding components on the link 10. Such a kit enables the quick and easy replacement of the corresponding components. The bushings, for example, have the same configuration and are constructed of the same materials, and, thus, they can be installed quickly and easily since virtually no time is spent determining where each individual bushing goes. Since the proximal and distal washers 34, 35 have different inner diameters which correspond to the portions of the shaft on which they are to be installed, they also can be installed relatively quickly.

If desired, the kit may also include one pair of nuts 36 to avoid having to reuse nuts that may be difficult to re-install due to corrosion or wear and tear. If the nuts are castle nuts, a pair of cotter pins may also be included as part of the kit to enhance the quick and easy replacement of the castle nuts.

The foregoing description is for purposes of illustration only and is not intended to limit the scope of protection accorded this invention. The scope of protection is to be measured by the following claims, which should be interpreted as broadly as the inventive contribution permits.

What is claimed is:

1. A stabilizer link comprising:
   a) a pair of cylinders, cylinder defining a pair of contiguous bores opening in opposite directions, each pair of bores defining an axis;
   b) a stem joining the cylinders;
   c) two pairs of bushings, each bushing received into a respective bore, each bushing defining a channel;
   d) two shafts, each shaft received into the channels of a respective pair of bushings; and
   e) a plurality of fastening elements for securing the shafts within the channels of respective pairs of bushings.

2. The stabilizer link of claim 1 wherein the axes of the pairs of bores are substantially parallel.

3. The stabilizer link of claim 2 wherein each bore tapers outward in a direction opposite its contiguous bore, each bushing being matingly received into its respective bore.

4. The stabilizer link of claim 3 wherein the bushings are tapered to complement the tapered bores defined by the cylinders.

5. The stabilizer link of claim 3 wherein each channel is substantially cylindrical along a length of its respective bushing and each bushing includes a pair of parallel flat ends and first and second frustoconical outer bushing walls with tapers that narrow toward the bushing flat ends, the first outer bushing wall extending along most of the length of the bushing and being matingly received by its respective bore, the second outer bushing wall extending at least partially beyond its respective bore, the flat ends of the bushings being substantially perpendicular to the axes of the bores.

6. The stabilizer link of claim 3 wherein the bushings are constructed of polyurethane.

7. The stabilizer link of claim 6 wherein the polyurethane has a hardness of about 85 to about 95 durometers.

8. The stabilizer link of claim 1 wherein each shaft has a distal end adapted to be engageable with a component of a vehicle.

9. The stabilizer link of claim 8 wherein each shaft further includes a tapered portion adjacent the distal end to matingly engage an oppositely tapered portion on the component of the vehicle.

10. The stabilizer link of claim 1 wherein each bushing has a pair of ends and the fastening elements includes two pairs of washers, each pair of washers disposed about respective shafts and located outside of the bores and channels, each bushing being in abutting engagement with a respective washer.

11. The stabilizer link of claim 10 wherein each washer includes a flat portion and a circumferential flange angled with respect to the flat portion.

12. The stabilizer link of claim 11 wherein the flanges of each respective pair of washers angle away from the respective cylinder.

13. The stabilizer link of claim 10 wherein each shaft has a proximal threaded end and the fastening elements further include a pair of nuts, each engageable with a respective proximal threaded end and being in abutting engagement with a respective washer.

14. The stabilizer link of claim 13 wherein a cotter pin hole is defined in each threaded end and the nuts are castle nuts, and wherein the fastening elements further include a pair of cotter pins for securing the castle nuts to the threaded ends.

15. The stabilizer link of claim 1 wherein each cylinder includes a tapered inner wall that defines one of the pairs of tapered bores and a central ridge dividing the bores, the inner walls being configured to limit the axial movement of the bushings.

16. The stabilizer link of claim 15 wherein the bushings are tapered to complement the tapered bores defined by the cylinders.

17. The stabilizer link of claim 1 wherein the stem is welded to each cylinder to define a housing.

18. The stabilizer link of claim 1 wherein the stem is integral with the cylinders to define a one-piece housing.

19. The stabilizer link of claim 18 wherein the housing is constructed of a molded polymer.

20. A stabilizer link comprising:
   a) a pair of cylinders, each cylinder defining a pair contiguous bores opening in opposite directions, each pair of bores defining an axis;
   b) a stem joining the cylinders, with the axes of the pairs of bores being substantially parallel;
   c) two pairs of bushings having a length and two ends, each bushing being matingly received into a respective bore with one end extending beyond the respective bore, each bushing defining a substantially cylindrical channel along its length with the channels of respective pairs of bushings being aligned;
   d) two shafts, each shaft having a proximal end and a distal end and being received into the channels of a respective pair of bushings, the distal ends being adapted to be engageable with a component of a vehicle;
   e) two pairs of washers, each pair of washers disposed about a respective shaft and located outside of the bores and channels, each washer being in abutting engagement with one of the ends of a respective bushing; and
   f) two fasteners on the proximal ends of the shafts engaging two of the washers for securing the shafts within the channels.

21. The stabilizer link of claim 20 wherein each bushing includes first and second frustoconical outer bushing walls with tapers that narrow toward the bushing ends, the first outer bushing wall being matingly received by its respective bore, the second outer bushing wall extending beyond its respective bore.

22. The stabilizer link of claim 20 wherein each washer includes a flat portion and a circumferential flange angled with respect to the flat portion by between about 15 degrees and about 45 degrees away from the respective bushing.

23. The stabilizer link of claim 20 wherein the bushings are substantially the same in configuration and material.

24. A stabilizer link comprising:
   a) a pair of cylinders, each cylinder defining a pair of open ends and having an inner wall that defines a pair of connected tapered bores contiguous with respective open ends and tapered to open in opposite directions along a common axis;
   b) a stem having two ends, each end being joined to one of the cylinders with the axes of the pairs of bores being substantially parallel;
   c) two pairs of bushings, each bushing matingly received into a respective bore, each bushing defining a cylindrical channel and including a pair of parallel flat ends and first and second frustoconical outer bushing walls with tapers that narrow toward the bushing flat ends, the first outer bushing wall extending along most of the length of the bushing and being matingly received by its respective bore, the second outer bushing wall extending beyond the respective bore, the flat ends of the bushings being substantially perpendicular to the axes of the bores;
   d) two shafts, each shaft received into the channels of a respective pair of bushings, each shaft comprising (i) first and second threaded ends, the first threaded end being engageable with a component of a vehicle; (ii) a tapered portion located adjacent the first threaded end to matingly engage correspondingly tapered portions on the components of the vehicle; (iii) a bushing portion extending into the channels of the respective pair of bushings; and (iv) a central portion joining the tapered and bushing portions and defining a lateral face adjacent the bushing portion, the bushing portion having a diameter less than the diameters of the tapered and central portions;
   e) two pairs of first and second washers, each pair disposed about one of the shafts and located outside the bores, the first washers being in abutting engagement with the flat ends of respective bushings and the lateral faces of the central portion of its respective shaft and the second washers being in abutting engagement with the flat ends of the other respective bushings; and
   f) a pair of nuts, each being engageable with the other threaded end of one of the shafts and being in abutting engagement with the second washers.

25. The stabilizer link of claim 24 wherein the inner wall of each cylinder is rounded outwardly at each open end.

26. The stabilizer link of claim 24 wherein each washer has a flat portion and a circumferential flange, the circumferential flange extending at an angle with respect to the flat portion in the range of about 15 degrees to about 45 degrees, the flanges of each pair of washers angled in opposite directions away from the respective bushings.

27. A replacement kit for a stabilizer link that has a pair of cylinders, each cylinder defining a pair of contiguous tapered bores opening in opposite directions, each bore having an axis; a stem joining the cylinders, and two shafts, each received into a respective pair of bores; the kit comprising:
   a) two pairs of bushings, each bushing configured to be matingly received into one of the respective bores, each bushing defining a generally cylindrical channel and the channels of each pair of bushings configured to receive one of the respective shafts; and
   b) two pairs of washers for retaining the bushings within the bores; and
   c) a container that retains the bushings and washers.

28. The replacement kit of claim 27 further including a pair of nuts, each nut configured to engage the respective shaft to secure the shaft within the channels, the container also receiving the nuts.

29. The replacement kit of claim 27 wherein each of the washers defines a respective circular hole for receiving its respective shaft, the holes of the washers of each pair of washers having different diameters.

30. The replacement kit of claim 27 wherein each washer includes a flat portion and a circumferential flange angled with respect to the flat portion.

31. The replacement kit of claim 27 wherein all of the bushings are substantially the same in configuration and material.

32. The replacement kit of claim 27 wherein the channel of each bushing extends along a length of the bushing and each bushing includes a pair of flat ends and first and second frustoconical outer bushing walls with tapers that narrow toward the bushing flat ends, the first outer bushing wall extending along most of the length of the bushing and being configured to be matingly received by its respective bore, the second outer bushing wall configured to extend at least partially beyond its respective bore when the first outer bushing wall is matingly received by its respective bore, the flat ends of the bushings adapted to extend substantially perpendicular to the axes of the bores.

33. The replacement kit of claim 27 wherein the bushings are substantially the same in configuration and material.

34. A replacement kit for a stabilizer link that has a pair of cylinders, each cylinder defining a pair of contiguous tapered bores opening in opposite directions, each bore having an axis; a stem joining the cylinders, with the axes of the bores of the respective cylinder being substantially parallel; and two shafts, each received into one of the bores; the kit comprising:
   a) two pairs of bushings, each bushing configured to be matingly received into one of the respective bores, each bushing defining a cylindrical channel and including a pair of parallel flat ends and first and second frustoconical outer bushing walls with tapers that narrow toward the bushing flat ends, the first outer bushing wall extending along most of the length of the bushing and configured to be matingly received by its respective bore, the second outer bushing wall configured to extend beyond the one bore when the first outer bushing wall is matingly received by its respective bore, the flat ends of the bushings being configured to be substantially perpendicular to the axes of the bores when the bushings are received into the bores;
   b) a pair of first and second washers, each pair configured to be disposed about one of the respective shafts and located outside the bores, the first washers adapted to be in abutting engagement with the flat ends of respective bushings and the second washers adapted to be in abutting engagement with the flat ends of the other bushings, each washer having a flat portion and a circumferential flange angled with respect to the flat portion, the flanges of each pair of washers angled to extend in opposite directions away from the respective bushings when the washers are disposed about the shafts;
   c) a pair of nuts, each being engageable with one of the respective shafts, one of the washers of each pair of washers adapted to abuttingly engage a respective castle nut; and d) a container retaining the bushings, washers and nuts.

35. The replacement kit of claim 34 wherein the first and second washers each define a hole, the holes being different sizes.

36. The replacement kit of claim 34 wherein each of the first and second washers has a flat portion and a circumferential flange, the circumferential flange extending at an angle with respect to the flat portion in the range of about 15 degrees to out 45 degrees.

37. The replacement kit of claim 34 wherein each of the first and second washers has a flat portion and a circumferential flange, the circumferential flange extending at an angle with respect to the flat portion of about 30 degrees.

38. The replacement kit of claim 34 wherein the bushings are constructed of polyurethane having a hardness of about 85 to about 95 durometers.

39. The replacement kit of claim 34 wherein the bushings are substantially the same in configuration and material.

40. The replacement kit of claim 27 further comprising:
(a) a pair of cylinders, each cylinder defining a pair of contiguous, bores opening in opposite directions, each pair of bores defining an axis;
(b) a stem joining the cylinders;
(c) two shafts, each shaft received into the channels of a respective pair of bushings; and
(d) a plurality of fastening elements for securing the shafts within the channels of respective pairs of bushings.

* * * * *